Nov. 25, 1924.
W. E. BERNHARDT
VEGETABLE CUTTER
Filed Nov. 7, 1921
1,516,490
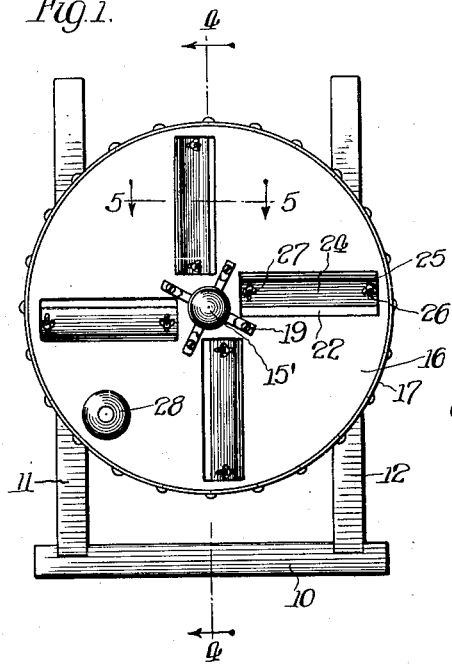
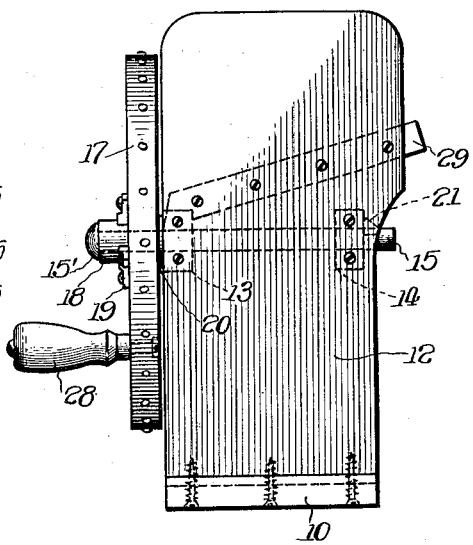
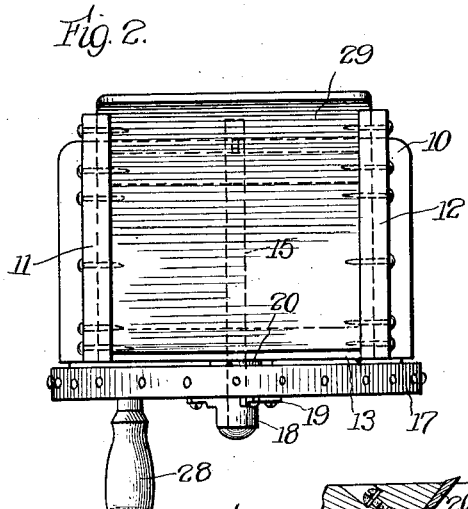
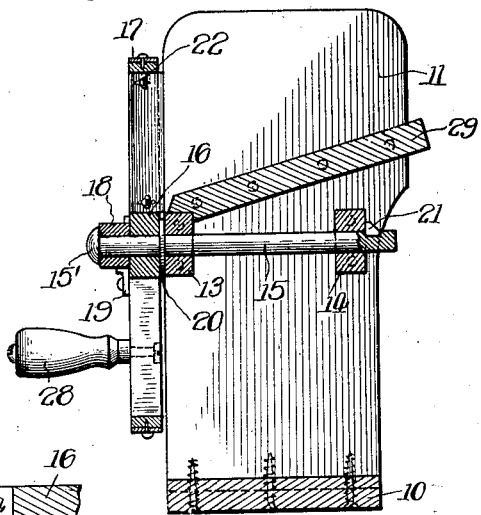
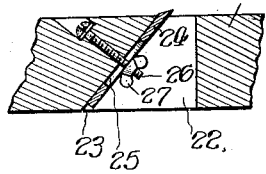
Witness:
A. J. Sauser
Inventor
William E. Bernhardt,
By Fred Gerlach
his Atty Patented Nov. 25, 1924.

1,516,490

UNITED STATES PATENT OFFICE.

WILLIAM E. BERNHARDT, OF CHICAGO, ILLINOIS.

VEGETABLE CUTTER.

Application filed November 7, 1921. Serial No. 513,352.

*To all whom it may concern:*

Be it known that I, WILLIAM E. BERNHARDT, a citizen of the United States, and a resident of Chicago, in the county of Cook and State of Illinois, have invented certain new and useful Improvements in Vegetable Cutters, of which the following is a full, clear, and exact description.

My invention relates to vegetable cutters for cutting up or slicing cabbage, potatoes, cucumbers, or other vegetables. The object of my invention is to produce a cutter which can be operated with greater accuracy, speed and safety and with less labor than the devices heretofore used.

My improved cutter is clearly shown on the accompanying drawing, in which—

Fig. 1 is a front elevational view,

Fig. 2 is a top view,

Fig. 3 is a side elevational view,

Fig. 4 is a sectional view on plane 4—4, Fig. 1, and

Fig. 5 is an enlarged sectional view on plane 5—5, Fig. 1.

The device has an upright supporting frame comprising the base 10, and the vertical side walls 11 and 12. Front and rear horizontal cross beams 13 and 14 secured to the side walls, serve to support or journal a shaft 15 on which is mounted the cutting disk 16. The disk is preferably of wood and strengthened by a sheet metal tire 17 secured thereto. At its front end the shaft 15 extends through the disk at the center thereof and through the hub 18, which hub is rigidly secured to the disk by means of the arms 19. Between the disk and the front beam 13 is interposed the washer 20. The hub is engaged by the head 15' on the shaft and a key 21 engaging against the rear cross beam 14 holds the shaft against longitudinal movement and the disk in bearing engagement against the washer 20.

The disk has a plurality of slots 22 whose rear edges 23 are beveled to form seats for the knife blades 24. The knife blades may be adjustably secured against the seats. As shown, the blades have the slots 25 for receiving the threaded pins 26 extending from the beveled seats, the pins being engaged by wing nuts 27 by means of which the blades can be secured in adjusted position. The blades extend a distance beyond the rear face of the disk depending upon the depth of cut desired. The washer 20 is of sufficient thickness to permit for adjustment of the blades and to prevent engagement of the blades with the walls 11 and 12. The disk may be turned by power or, as shown, a handle 28 may be provided thereon so that it may be turned by hand.

Above the cross beams 13 and 14 the feed shelf 29 is secured between the side walls 11 and 12, this shelf inclining toward the disk so that the vegetables to be cut may readily be fed against the disk into the paths of the knives. The operator feeds the cabbage or other vegetable along the shelf 29 with one hand, and with the other hand turns the cutter disk, the projecting blades then rapidly slicing up the fed vegetable, the cuttings passing through the slots 22 and falling into a suitable receptacle placed in front of the device below the cutter disk. The knives can, of course, be set at any angle. As shown, they extend radially. Any number of knives could also be provided, four being shown. When the cutter disk is rapidly rotated, the numerous knives will, with great rapidity and accuracy, slice up the fed in material. The device can be operated much more conveniently and accurately than the old fashioned devices comprising a board with a single blade on which the vegetable must be shifted back and forth by hand.

My improved device can be constructed at very little cost. The disk and the supporting walls can be made of wood. The device can also be readily kept clean. By removing the key 21 the shaft with the cutter disk thereon can be withdrawn for cleaning purposes. I do not desire to be limited to the exact construction disclosed as changes and modifications may be made which would still come within the scope of the invention.

I claim as my invention:

In a vegetable cutter, the combination of a pair of side walls, a substantially flat bottom wall to which the lower ends of the side walls are connected and which forms a base for the cutter, cross-bars extending between and secured to said side walls, an inclined shelf for the material to be cut disposed between and secured to the side walls and forming with the portions of the side wall above it a guide chute for the material, the lower edge of said shelf being adapted to engage and be supported by one of said cross-bars, a disc provided with cutters adjacent one end of the side walls and the inclined wall, and a shaft to which the disc is secured rotatably mounted and carried by said cross-bars.

In witness whereof, I hereunto subscribe my name this 9th day of Sept., A. D. 1921.

WILLIAM E. BERNHARDT.